Feb. 2, 1971   R. BETZING   3,559,496
APPARATUS FOR TRANSFORMING ROTARY MOTION INTO LINEAR
DISPLACEMENT AND INCLUDING A SLIP-TYPE COUPLING
Filed July 26, 1968   4 Sheets-Sheet 1

INVENTOR.
RUDOLF BETZING
BY
Karl F. Ross
ATTORNEY

INVENTOR.
RUDOLF BETZING
BY
Karl F. Ross
ATTORNEY

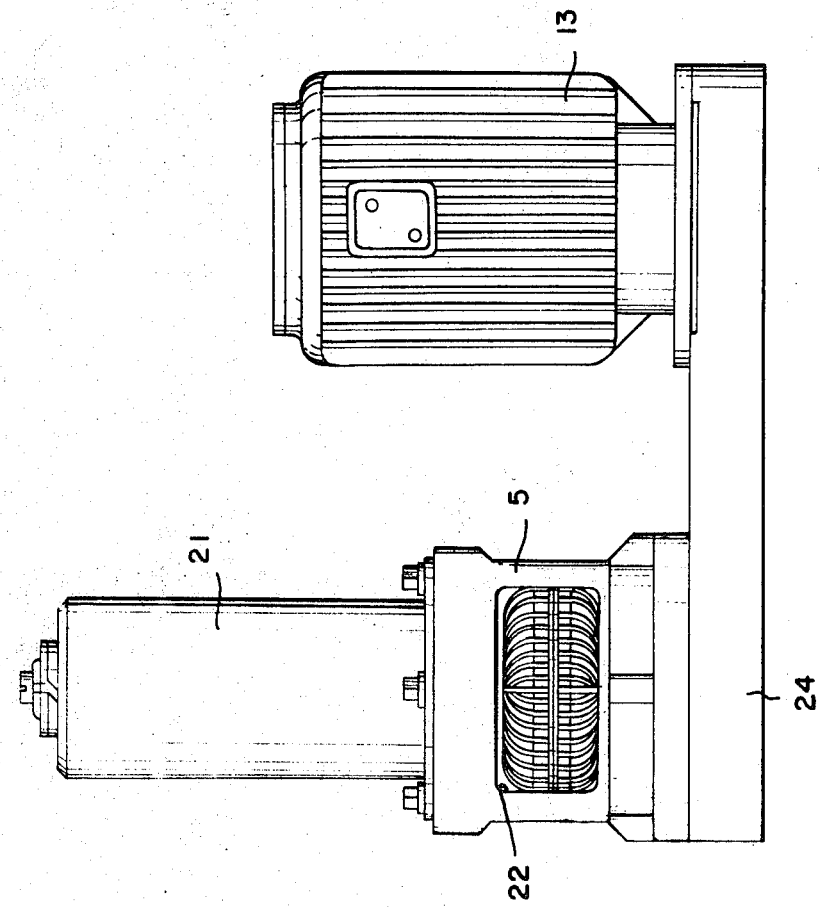
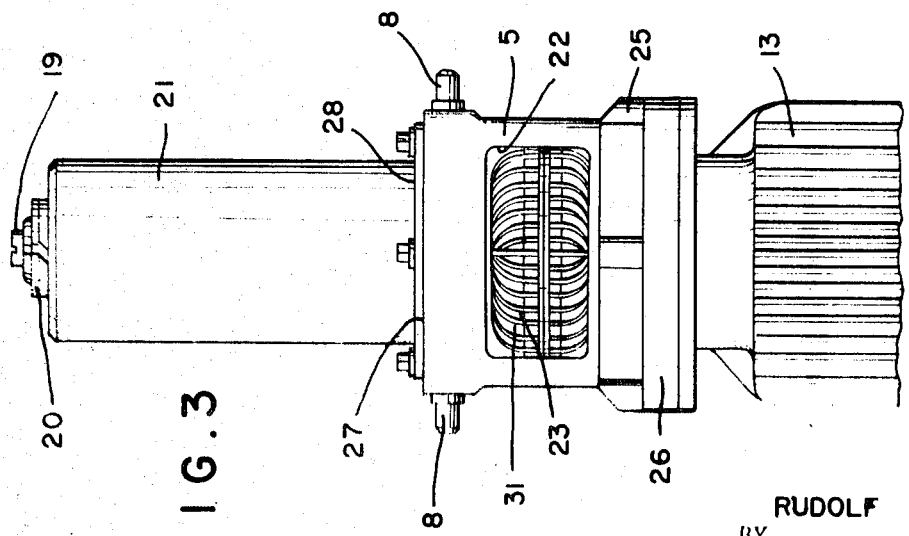

United States Patent Office 3,559,496
Patented Feb. 2, 1971

3,559,496
APPARATUS FOR TRANSFORMING ROTARY MOTION INTO LINEAR DISPLACEMENT AND INCLUDING A SLIP-TYPE COUPLING
Rudolf Betzing, Altendorf-Ulfkotte, Germany, assignor to AG Eisenhutte Prinz Rudolph, Dulmen, Westphalia, Germany, a German corporation
Filed July 26, 1968, Ser. No. 748,058
Claims priority, application Germany, July 26, 1967, P 15 83 123.9
Int. Cl. F16h 25/20
U.S. Cl. 74—89.15
8 Claims

ABSTRACT OF THE DISCLOSURE

An apparatus for converting rotary movement from a prime mover such as a gasoline engine or an electric motor, to linear movement for displacing a load wherein a rotary screw member is mounted in a casing and is either an axially shiftable nut or a threaded spindle. The motor casing terminates in a projecting shaft. A tubular casing, with openings in the walls for the throughflow of air, is provided between the screw casing and the motor casing and is flanged to both to produce a housing separated from the screw and motor and receiving a slip-type coupling, the parts of which are connected to the shaft of the screw assembly and to the motor shaft. A bearing of the combined thrust and radial type is provided in the plate of the tubular housing between the coupling and the screw assembly while a flexible coupling is provided in the housing space between the coupling and the motor shaft. The coupling body is provided with air-displacing elements.

---

This invention relates to actuators, shifters or similar equipment with mechanically driven screw-type gears as converters for transforming rotary movement into linear movement especially for underground mining to shift conveyors, mining equipment such as miners, loaders, mining support equipment, and the like.

As is known, equipment of this kind has a drive system where either the spindle is driven and the threaded nut is moved forwardly or rearwardly, the nut itself being prevented from rotating, or the threaded nut is rotated and the nonrotating spindle is moved back and forth.

To save space, the nut is often incorporated into the rotor of the prime mover (electric motor). The motor casing and gear housing enclose a common space. Other designs are known wherein the motor casing is separated from the gear or spindle housing by a flange plate, receiving the bearing, so that the threaded nut and the spindle are contained in a space separated from the motor. The basic design of those actuators and shifters have a motor casing and a spindle casing. Additionally all of the accessories necessary for proper functioning as, for instance, switch devices, slip-type couplings or the like are incorporated in those spaces (casings) which can be regarded as closed spaces. This has the disadvantage that those parts are relatively inaccessible, that their incorporation into the systems is limited due to the limited amount of space and that the additional equipment generates heat which can be only limitedly transferred to the exterior. These disadvantages have stopped the introduction into practice of equipment which is advantageous, for instance the application of slip-type couplings between motor and spindle.

With these couplings, be they the well-known friction-type clutches or fluid couplings or the like, the amount of heat is especially large when this coupling is frequently or continuously operated. When motors are used which do not have full torque at idle, the motor continues to rotate even when the load does not move axially. In this condition the coupling has a certain amount of slip and gets hot. With a closed casing, this heat can not be transferred to outside without special cooling equipment. This however, requires special measurements in designing the aforesaid casings or spaces. It could be thought to arrange for a special cooling system. This requires that a cooling medium, e.g. air, is led to the coupling. The closed space must therefore be provided with inlets for cooling air.

On the other hand if they are opened, dust will penetrate and bearings, spindle drives and other components may malfunction.

Other conventional equipment suffers under impact stress of main components, especially bearings, thus reducing sharply the useful life. This applies especially when operating with slip-type couplings.

An object of this invention is to provide an improved apparatus of the character described which permits the use of slip-type couplings and, possibly, other additional components in such manner as to guarantee continuous and permanent operation without altering the basic design of those components.

This invention provides an actuator, a shifter or the like with a rotating screw-type drive as a converter for transforming rotary movement into linear movement as mentioned above, especially for underground mining to shift long conveying equipment, mining equipment, wall-lining components etc. The apparatus has a motor casing and a spindle casing and a coupling between the motor and the screw drive. This invention uses a casing with cooling inlets to form a third space linking motor casing and spindle casing and secured at one free end flange to the flange of an electric motor, air-driven motor or combustion engine and at the other free end flange to the screw-drive casing flange. The slip-type coupling is housed in this third space, the bottom plate of the lantern-like casing serving as place for fitting the bearings of rotating parts as well as taking up all bolting, eyes or similar to mount this actuator.

Primarily this invention provides for a separate space to receive the slip-type coupling which may be cooled by air without dust entering into the other spaces via the cooling medium. Additionally all forces by the actuator to be transferred to the application are led from the actuator's main bearings to the pivot bearing on the lantern. The bottom plate of the lantern is amply dimensioned to serve as a base.

According to another feature of this invention, the lantern is made of a tube with openings within the wall and a bottom plate separated from this tube. In further development of this idea the tube may consist of two halves. According to yet another feature, the bottom plate has two bearings within the center bore, be it for the spindle or for the main shaft of the screw drive, the bearings being provided at a distance from one another of at least one shaft diameter. This arrangement is of special importance to take up centrifugal forces and oscillating movements usual at shafts and spindles which are normally very long at those actuators. A design especially advantageous can be arranged for with one of the two supporting bearings in the form of 4-point bearings of which the inner ring is split and the split halves are adjustable by a tension nut. This makes it possible to adjust axial play accurately.

This radiax-type bearing takes up axial forces and transfers same to the bottom plate while the second bearing, set at a distance has to transfer radial forces only. For actuators with shorter stroke or minor power requirements it is also possible to employ barrel-type roller bearings of which the inner rings are adjustable relative to one another.

Another feature of this invention uses the lantern as part of a ventilator cooling the slip-type coupling, the casing of the slip-type coupling serving as a blower wheel located between motor and screw drive as described above. The application of a fluid drive gives special advantages by using the fluid-drive housing as a blower wheel, thus forming the cooling system from the fluid-drive housing as a blower wheel and the lantern as a blower housing.

Inlet and outlet of cooling air may be arranged for in different ways, openings within the wall of the lantern, for instance, may serve as inlet or outlet. With cooling slots at the flange surfaces of lantern or motors, the design is extremely simple.

The above and other objects, features and advantages will become more readily apparent from the following description, reference being made to the accompanying drawing in which: FIG. 1 is a cross section cutting through the center part of an actuator according to the invention;

FIGS. 3 and 4 are elevational views of different embodiments;

Figure 1:
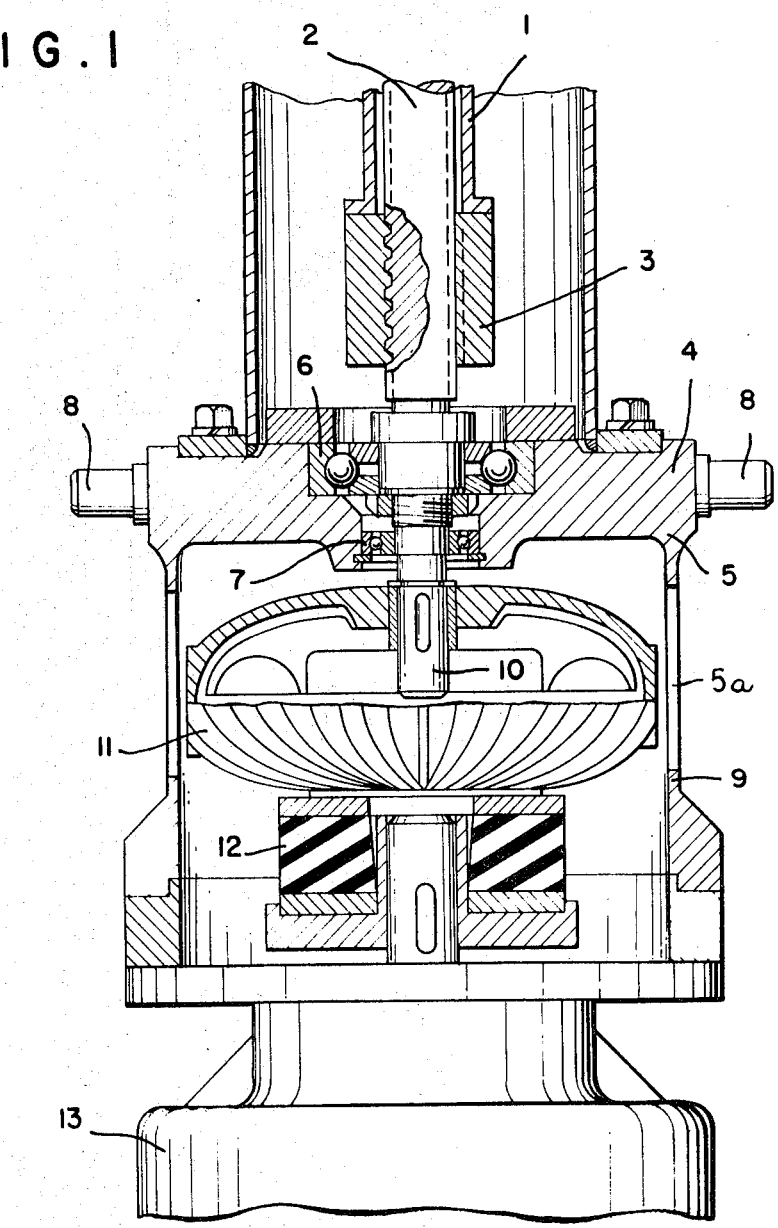
FIG. 1 is a cross section cutting through the center part of an actuator according to the invention.

The ram 1 in FIG. 1 surrounds spindle 2 as a tube. Ram 1 consists mainly of a tube connected to spindle nut 3 preferably designed as a ball-type spindle gear. Spindle 2 is supported in bottom plate 4 of a pot-type lantern structure 5. This support consists of a radiax bearing of Vierpunktlager 6 (combined thrust and radical bearing) and an additional bearing 7 set at a distance of at least 1 shaft diameter.

To serve as bearing support, bottom plate 4 of the pot type lantern 5 is amply dimensioned to receive at its outside pivots 8 or eyes or the like to support the whole unit. Not shown is the possibility of manufacturing bottom 4 and tube like part 9 separated and to join both at assembly. This gives another possibility likewise not shown, i.e. to split axially part 9 and to assemble it from two parts. Socket pin 10, as an extension of the spindle supported in bottom plate 4 extends into lantern 5.

If the spindle is not supported as it is usual with screw nuts or hollow shafts fixed to screw nuts at other systems, screw nuts and hollow shafts are provided to replace this spindle. Onto this socket pin 10 the fluid coupling 11, serving as a slip-type coupling is sleeved and connected to the shaft by the secondary wheel of the fluid coupling. The primary wheel is connected to a flexible coupling 12 interposed between the primary wheel and motor 13.

The lantern has openings 5a for cooling-air admission and discharge; these may also be provided as slots in the flange surface.

It is easily understandable that prime movers other than the electric motor shown may be employed, e.g. combustion engines and air-operated motors.

Figure 2:
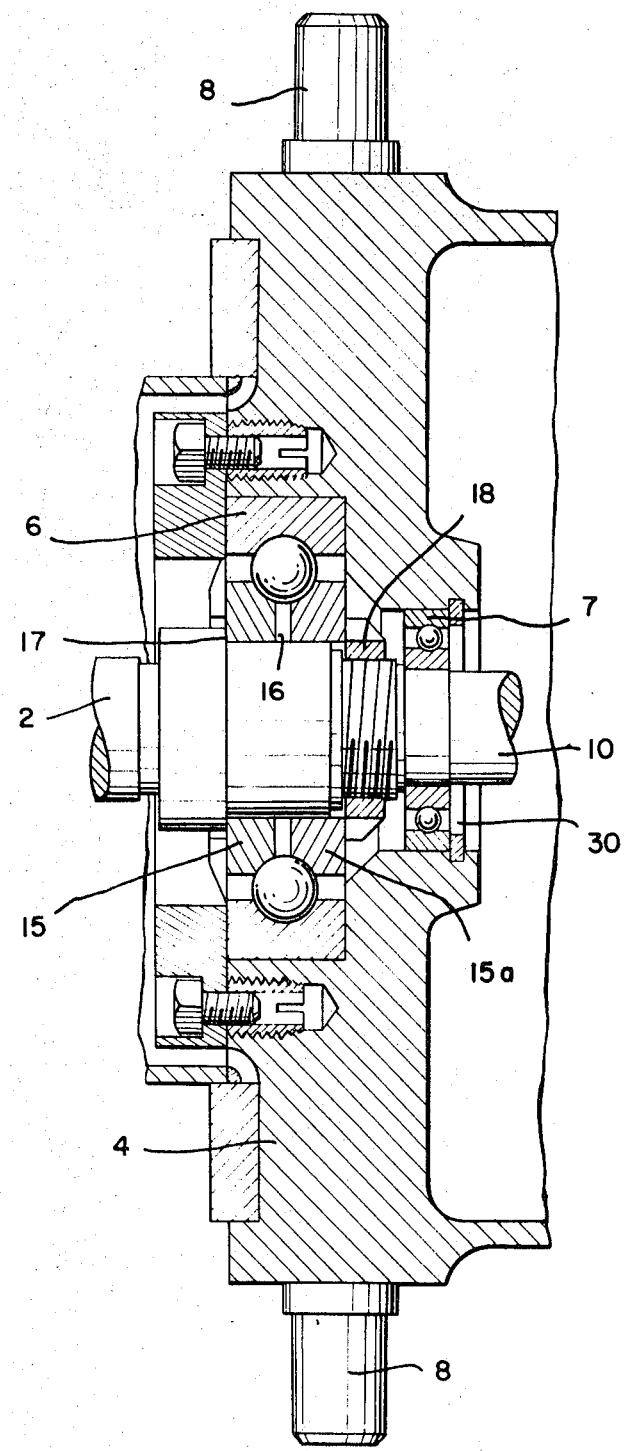
FIG. 2 is an enlarged detail of the bottom plate with its center bore.
Figure 5:
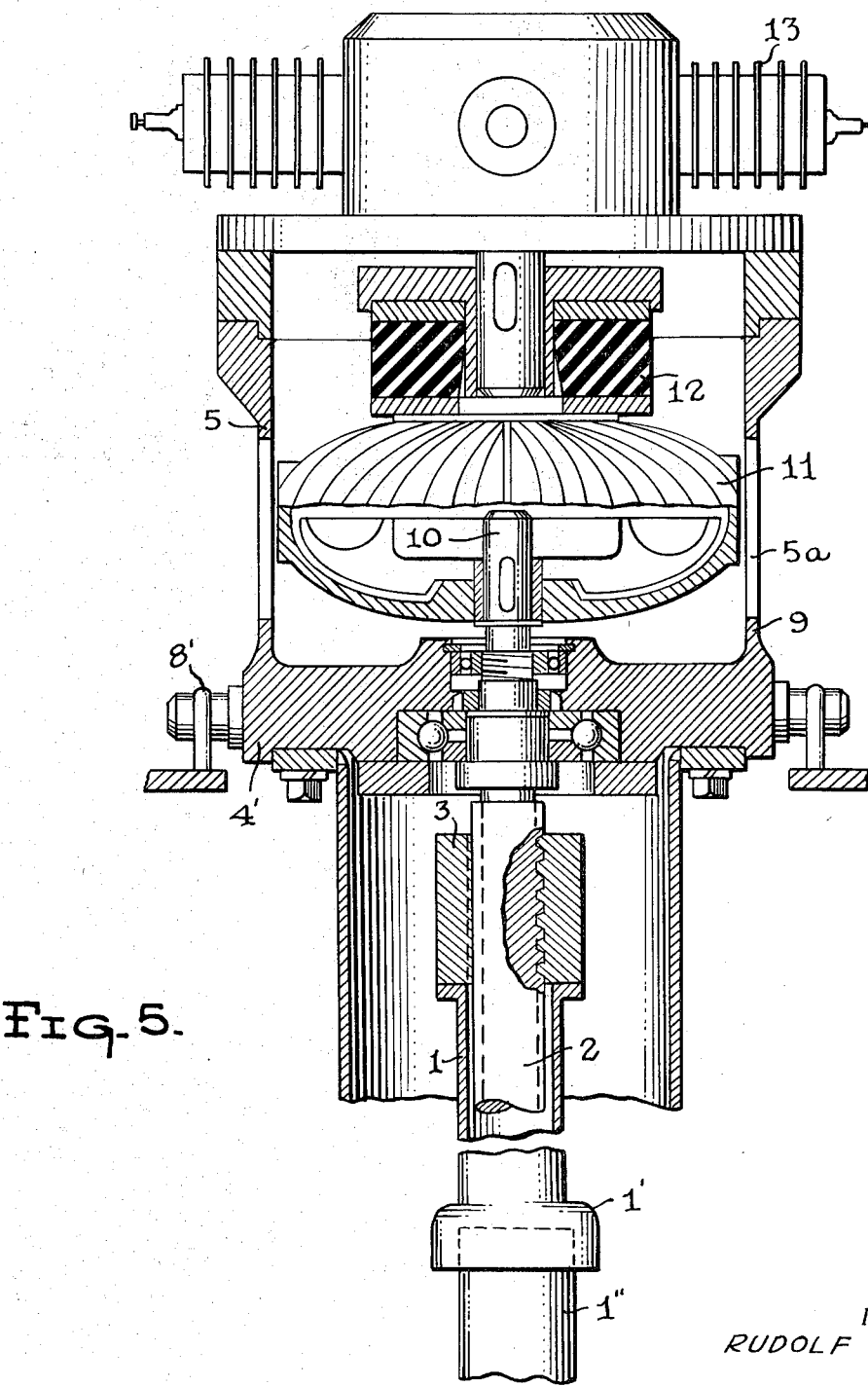
FIG. 5 is a view similar to FIG. 1, illustrating yet another embodiment of the invention.

The arrangement of the bearings is shown in FIG. 2 separately. Dotted is one portion of a pot-type bottom 4 with flange or collar 14 raised in direction to the lantern. The upper bearing is radiax-type bearing 6. Its inner ring 15 consists of two parts 15 and 15a separated from each other by gap 16. To the left the bearing touches collar 17, to the right it is held by nut 18. By this nut it is adjustable without play. Collar 14 carries radial type bearing 7 taking up centrifugal forces of the shafting.

FIG. 3 shows a view of an apparatus with the electric motor in parallel to spindle. 19 is the eye bolt of ram 20, supported in spindle casing 21 which is flanged to lantern 5 with the support 6 in the lantern bottom 4. Lantern tube is formed with openings 22 in which fluid coupling 23 is visible. Fitted below lantern 5 is motor 13. The ribs 31 on the fluid-coupling housing serve to displace cooling air through the system.

FIG. 4 shows an arrangement with a gear box 24 between lantern 5 and motor 13 arranging for motor 13 parallel aside lantern and screw drive 21.

What is claimed is:

1. An apparatus for converting rotary motion into linear displacement, comprising:
   a drive motor having a casing and an axially extending shaft projecting from said casing;
   a screw assembly having a housing axially aligned with said shaft but spaced from said casing and including a rotatable axially fixed threading element received in said housing and provided with a shaft in axial alignment with the motor shaft, and a nonrotatable axially displaceable element threadedly engaging said rotatable element and connectable to a load;
   a lantern-type tubular enclosure interposed between said casing and said housing and connected thereto with said shafts extending into the space within said enclosure, said enclosure including a wall extending transversely to said shafts proximal to said housing and being formed with openings for the through-flow of air through said enclosure;
   combined radial-and-thrustbearing means in said wall rotatably journaling the shaft of said rotatable element;
   means on said enclosure for mounting said apparatus and restricting rotation of said housing, said casing and said enclosure; and
   a slip-type coupling having a pair of relatively rotatable co-operating coupling members, each engaging one of said shafts, at least one of said members being provided with means for displacing air through the interior of said enclosure.

2. The apparatus defined in claim 1 wherein said enclosure has a tubular wall provided with said openings and separate from the first-mentioned wall.

3. The apparatus defined in claim 1 wherein said wall is provided with a first seat for said combined bearing means and a further seat for a radial bearing spaced from said combined bearing means by a distance equal at least to the diameter of said shaft of said rotatable element, said apparatus further comprising a radial bearing received in said further seat.

4. The apparatus defined in claim 1 wherein said combined bearing means is a 4-point bearing of the radiax-type having a split inner ring with the parts thereof held together by a tension nut.

5. The apparatus defined in claim 1 wherein said slip-type coupling is a fluid coupling having a casing formed as a blower and connected to one of said shafts.

6. The apparatus defined in claim 1, further comprising a flexible coupling interposed between said motor shaft and the respective member of said slip-type coupling.

7. The apparatus defined in claim 1 which constitutes a system for lifting a load wherein said nonrotatable element is connectable to a pile.

8. The apparatus defined in claim 1 wherein said casing is a gear box containing a gear transmission coupling said motor to said motor shaft.

References Cited

UNITED STATES PATENTS

| | | | |
|---|---|---|---|
| 986,498 | 3/1911 | Raders | 64—26 |
| 1,095,132 | 4/1914 | Thomson | 60—54 |
| 1,210,516 | 1/1917 | Morris | 308—196 |
| 1,855,032 | 4/1932 | Sinclair | 60—54 |
| 3,080,952 | 3/1963 | Carlstedt | 74—424.8 |

WESLEY S. RATLIFF, JR., Primary Examiner

U.S. Cl. X.R.

74—424.8